US011966940B2

(12) United States Patent
Robeen

(10) Patent No.: US 11,966,940 B2
(45) Date of Patent: *Apr. 23, 2024

(54) SYSTEMS AND METHODS FOR CONNECTING MERCHANT LOYALTY PROGRAMS WITH PAYMENT CARDS

(71) Applicant: Mastercard International Incorporated, Purchase, NY (US)

(72) Inventor: Erica Robeen, Hardin, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 670 days.

This patent is subject to a terminal disclaimer.

(21) Appl. No.: 16/588,424

(22) Filed: Sep. 30, 2019

(65) Prior Publication Data

US 2020/0027113 A1   Jan. 23, 2020

Related U.S. Application Data

(63) Continuation of application No. 14/244,545, filed on Apr. 3, 2014, now Pat. No. 10,430,819.

(51) Int. Cl.
*G06Q 30/0226* (2023.01)
*G06Q 20/22* (2012.01)
(Continued)

(52) U.S. Cl.
CPC ......... *G06Q 30/0226* (2013.01); *G06Q 20/29* (2013.01); *G06Q 20/34* (2013.01);
(Continued)

(58) Field of Classification Search
CPC .............................................. G06Q 20/40145
See application file for complete search history.

(56) References Cited

U.S. PATENT DOCUMENTS

| 6,012,039 A * | 1/2000 | Hoffman | G06Q 20/40 |
| | | | 705/76 |
| 6,901,375 B2 * | 5/2005 | Fernandez | G06Q 30/0235 |
| | | | 705/14.27 |

(Continued)

FOREIGN PATENT DOCUMENTS

| KR | 2007092773 A | 9/2007 | |
| WO | WO-2005084398 A2 * | 9/2005 | ........... G06Q 20/206 |

OTHER PUBLICATIONS

Raina, Vibha Kaw, "Chapter 14: Emerging Technologies for User-Friendly Mobile Payment Applications", 2014, IGI Global, pp. 279-303. (Year: 2014).

(Continued)

*Primary Examiner* — Marie P Brady
(74) *Attorney, Agent, or Firm* — Armstrong Teasdale LLP

(57) ABSTRACT

A computer-based method for providing a loyalty identifier to a merchant using a payment network is described. The method includes storing data including at least one loyalty identifier associated with a cardholder enrolled in a loyalty program and a corresponding payment card identifier, receiving a first authorization request message for a payment transaction initiated by a first cardholder using a first payment card at an originating merchant, the first authorization request message including a first merchant identifier and a first payment card identifier, determining a first loyalty program associated with the originating merchant based in part on the first merchant identifier and the data stored in the memory, determining a first loyalty identifier associated with the first cardholder for the first loyalty program based in part on the first payment card identifier and the data stored in the memory, and providing the first loyalty identifier to the originating merchant.

20 Claims, 8 Drawing Sheets

(51) Int. Cl.
*G06Q 20/34* (2012.01)
*G06Q 20/38* (2012.01)
*G06Q 20/40* (2012.01)

(52) U.S. Cl.
CPC ......... *G06Q 20/355* (2013.01); *G06Q 20/387* (2013.01); *G06Q 20/40* (2013.01)

(56) References Cited

U.S. PATENT DOCUMENTS

| | | | |
|---|---|---|---|
| 6,980,670 B1* | 12/2005 | Hoffman | G07C 9/37 705/14.23 |
| 7,870,071 B2 | 1/2011 | Gupta | |
| 8,046,256 B2 | 10/2011 | Chien et al. | |
| 8,200,545 B2 | 6/2012 | Hunt | |
| 8,317,094 B2 | 11/2012 | Lehman | |
| 8,321,338 B2* | 11/2012 | Baumgart | G06Q 20/204 705/14.1 |
| 8,401,898 B2 | 3/2013 | Chien et al. | |
| 8,468,054 B1 | 6/2013 | Espinoza et al. | |
| 8,606,709 B2 | 12/2013 | Gupta | |
| 8,620,738 B2 | 12/2013 | Fordyce, III et al. | |
| 8,660,893 B2 | 2/2014 | Fordyce, III | |
| 2002/0065712 A1 | 5/2002 | Kawan | |
| 2002/0152123 A1 | 10/2002 | Giordano et al. | |
| 2005/0097037 A1 | 5/2005 | Tibor | |
| 2005/0216340 A1* | 9/2005 | Schneider | G06Q 30/02 705/14.36 |
| 2006/0155603 A1 | 7/2006 | Abendroth et al. | |
| 2006/0218038 A1* | 9/2006 | Grider | B42D 15/045 705/14.27 |
| 2008/0021840 A1* | 1/2008 | Beenau | H04W 12/069 340/426.36 |
| 2008/0059306 A1 | 3/2008 | Fordyce et al. | |
| 2008/0147481 A1* | 6/2008 | Robinson | G06Q 30/02 |
| 2009/0228362 A1* | 9/2009 | Lapsley | H04L 63/083 705/78 |
| 2009/0271262 A1* | 10/2009 | Hammad | G06Q 20/40 709/204 |
| 2011/0191248 A1* | 8/2011 | Bishop | G06Q 20/363 705/67 |
| 2011/0320353 A1* | 12/2011 | Mehew | G06F 21/32 705/44 |
| 2012/0253914 A1* | 10/2012 | Black | G06Q 30/02 705/14.28 |
| 2013/0041736 A1* | 2/2013 | Coppinger | G06Q 30/0239 705/14.23 |
| 2013/0054340 A1 | 2/2013 | Lehman | |
| 2013/0115969 A1* | 5/2013 | Holmes | G01S 5/06 455/456.1 |
| 2013/0282464 A1 | 10/2013 | Bradley | |
| 2014/0006116 A1 | 1/2014 | Ren | |
| 2014/0025461 A1 | 1/2014 | Knowles et al. | |
| 2014/0081737 A1* | 3/2014 | Gilman | G06Q 20/387 705/14.36 |
| 2014/0330729 A1* | 11/2014 | Colangelo | G06Q 20/4012 705/72 |
| 2016/0232507 A1* | 8/2016 | Gu | G06Q 20/20 |

OTHER PUBLICATIONS

PCT International Search Report and Written Opinion for related matter PCT/US2015/024243 dated Jul. 14, 2015; 11 pages.

* cited by examiner

SYSTEMS AND METHODS FOR CONNECTING MERCHANT LOYALTY PROGRAMS WITH PAYMENT CARDS

CROSS REFERENCE TO RELATED APPLICATIONS

This application is a continuation of U.S. patent application Ser. No. 14/244,545 filed on Apr. 3, 2014, entitled "SYSTEMS AND METHODS FOR CONNECTING MERCHANT LOYALTY PROGRAMS WITH PAYMENT CARDS", which is hereby incorporated by reference in its entirety.

BACKGROUND OF THE DISCLOSURE

The field of the disclosure relates generally to merchant-based loyalty programs, and more particularly to determining a cardholder's loyalty identifier for a loyalty program based on the cardholder's payment card.

Many merchants offer loyalty programs, where the merchant monitors a consumer's transactions with the merchant and then provides the consumer with a reward based on those transactions. For example, a merchant may provide a coupon for $10 off goods and/or services after a customer has purchased over $100 of goods and/or services from that merchant, or a merchant may provide the consumer with a coupon for a free coffee when a consumer has conducted 10 transactions with the merchant. Many loyalty programs provide the consumer with a loyalty program membership card with a unique identifier. When the consumer makes a transaction with the merchant, the consumer shows his or her membership card and the unique identifier is associated with the transaction. The transactions associated with the consumer's unique identifier are aggregated and when a threshold is reached the merchant may give the consumer a reward. Some loyalty programs count dollars spent, other programs count the number of transactions or count points earned. Some other loyalty programs provide a discount on the amount paid for every transaction.

Some of the loyalty programs provide the consumer with a personalized membership card. Other loyalty programs provide the consumer with a membership card with a unique identifier and then require the consumer to register the card with the merchant, usually online on the merchant's website. To use these loyalty programs, the consumer must show the card at each transaction. This can be problematic when the consumer has loyalty program cards for multiple different merchants. In some loyalty programs, when the consumer doesn't have their card, the cashier may be able to look it up. However, this slows down the transaction process.

BRIEF DESCRIPTION OF THE DISCLOSURE

In one aspect, a computer-based method for providing a loyalty identifier to a merchant using a payment network is described. The method is implemented using a computing device in communication with a memory. The method includes storing data within the memory including (i) at least one loyalty identifier associated with a cardholder enrolled in a loyalty program and (ii) a corresponding payment card identifier associated with the cardholder, and receiving a first authorization request message for a payment transaction initiated by a first cardholder using a first payment card at an originating merchant. The first authorization request message includes a first merchant identifier and a first payment card identifier, where the first payment card identifier is associated with the first payment card issued by an issuing bank to the first cardholder. The method also determining by the computing device a first loyalty program associated with the originating merchant based in part on the first merchant identifier and the data stored in the memory, determining by the computing device a first loyalty identifier associated with the first cardholder for the first loyalty program based in part on the first payment card identifier and the data stored in the memory, and providing the first loyalty identifier to the originating merchant.

In another aspect, a computing device for providing a loyalty identifier to a merchant using a payment network is described. The computing device includes one or more processors communicatively coupled to one or more memory devices. The computing device is configured to store data within the one or more memory devices including (i) at least one loyalty identifier associated with a cardholder enrolled in a loyalty program and (ii) a corresponding payment card identifier associated with the cardholder, and receive a first authorization request message for a payment transaction initiated by a first cardholder using a first payment card at an originating merchant. The first authorization request message including a first merchant identifier and a first payment card identifier, where the first payment card identifier is associated with the first payment card issued by an issuing bank to the first cardholder. The computing device is also configured to determine a first loyalty program associated with the originating merchant based in part on the first merchant identifier and the data stored in the memory, determine a first loyalty identifier associated with the first cardholder for the first loyalty program based in part on the first payment card identifier and the data stored in the memory, and provide the first loyalty identifier to the originating merchant In a further aspect, a computer-readable storage medium having computer-executable instructions embodied thereon is described. When executed by a computing device having at least one processor coupled to at least one memory device, the computer-executable instructions cause the processor to store data within the one or more memory devices including (i) at least one loyalty identifier associated with a cardholder enrolled in a loyalty program and (ii) a corresponding payment card identifier associated with the cardholder, and receive a first authorization request message for a payment transaction initiated by a first cardholder using a first payment card at an originating merchant. The first authorization request message including a first merchant identifier and a first payment card identifier, where the first payment card identifier being associated with the first payment card issued by an issuing bank to the first cardholder. The computer-executable instructions also cause the processor to determine a first loyalty program associated with the originating merchant based in part on the first merchant identifier and the data stored in the memory, determine a first loyalty identifier associated with the first cardholder for the first loyalty program based in part on the first payment card identifier and the data stored in the memory, and provide the first loyalty identifier to the originating merchant.

BRIEF DESCRIPTION OF THE DRAWINGS

FIG. 1 is a schematic diagram illustrating an example multi-party transaction card industry system for enabling ordinary payment-by-card transactions in which merchants and card issuers do not need to have a one-to-one special relationship.

FIG. 2 is a simplified block diagram of an example computer system including a plurality of computer devices in accordance with one example embodiment of the present invention.

FIG. 3 illustrates an example configuration of a client system shown in FIG. 2, in accordance with one embodiment of the present disclosure.

FIG. 4 illustrates an example configuration of the server system shown in FIG. 2, in accordance with one embodiment of the present disclosure.

FIG. 5 is a schematic diagram which illustrates an example of integrating a multi-party payment card system with determining cardholder loyalty identifiers for loyalty programs.

FIG. 6 is a flowchart illustrating an example of the process of determining a loyalty identifier for a cardholder based on an authorization request using the system shown in FIG. 2, in accordance with one embodiment of the disclosure.

FIG. 7 is a flowchart illustrating an example process of a cardholder registering for a loyalty program using the system shown in FIG. 2, in accordance with one embodiment of the present disclosure.

FIG. 8 is a diagram of components of one or more example computing devices that may be used in the system shown in FIG. 2.

DETAILED DESCRIPTION OF THE DISCLOSURE

Figure 1:
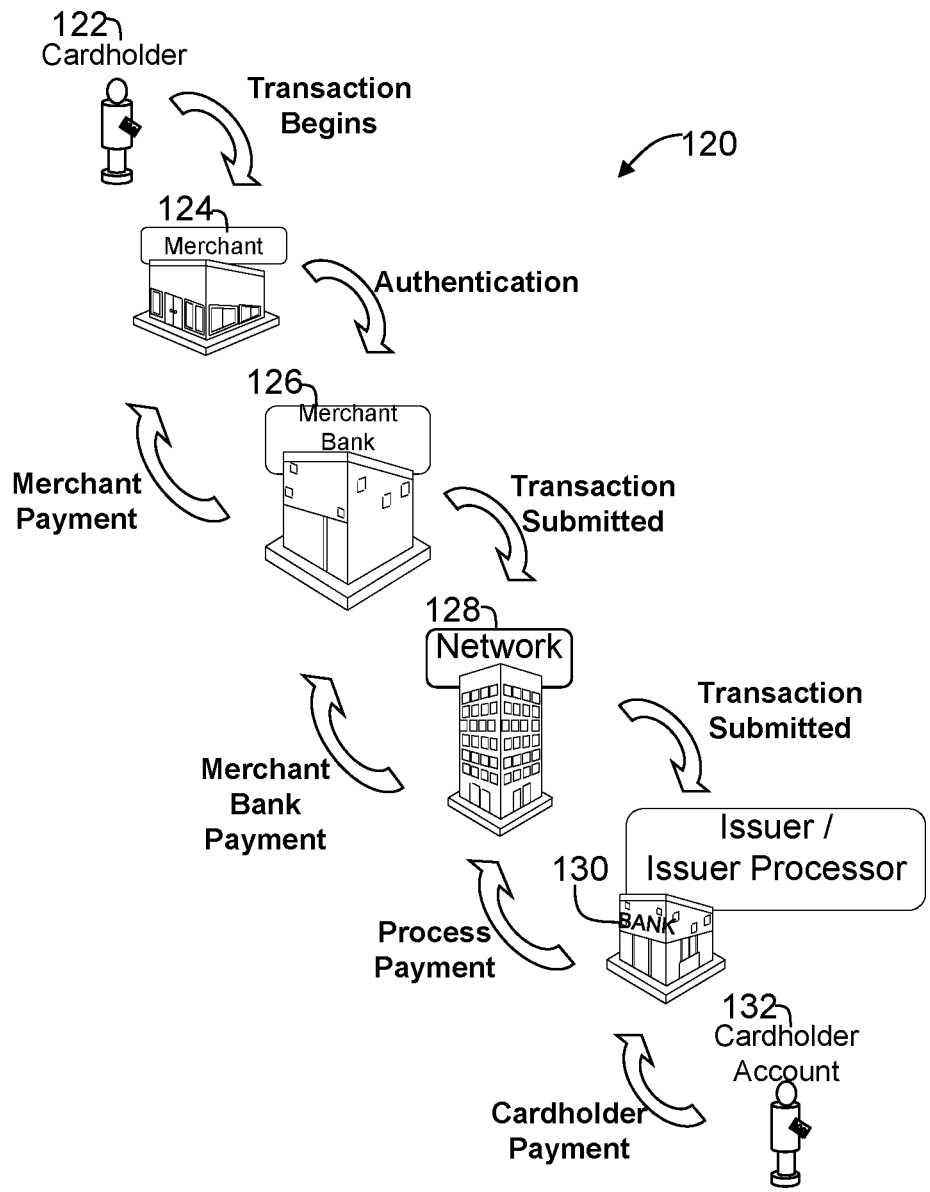
FIGS. 1-8 show example embodiments of the methods and systems described herein.

The following detailed description describes embodiments of the disclosure by way of example and not by way of limitation. The description clearly enables one skilled in the art to make and use the embodiments of the disclosure. The description describes several embodiments, adaptations, variations, alternatives, and uses of the disclosure, including what is presently believed to be the best mode of carrying out the disclosure. The disclosure is described as applied to an example embodiment, namely, methods and systems for determining a cardholder's loyalty identifier for a loyalty program based on the cardholder's payment card. More specifically, the disclosure describes a loyalty program ("LP") computing device configured to receive an authorization request message for a payment transaction originating from a merchant for a cardholder, determine the cardholder's loyalty identifier for a loyalty program associated with the merchant, and transmit the determined loyalty identifier to the merchant for further use by the merchant.

The purpose of tying the cardholder's payment card with the cardholder's loyalty programs is to provide the cardholder with the convenience of not having to carry multiple cards for multiple loyalty programs. When the cardholder uses their regular payment card to pay for a transaction with a merchant, the LP computing device determines if the cardholder is a member of that merchant's loyalty program. If the cardholder is a member, then the LP computing device transmits the cardholder's loyalty identifier to that merchant so that the transaction is associated with the cardholder's loyalty program account.

In the example embodiment, the LP computing device is configured for use with a payment card processing network such as, for example, an interchange network. The LP computing device includes a memory device and a processor in communication with the memory device and is programmed to communicate with the payment network (also known as the payment processor) to receive authorization request messages for payment transactions originating from a merchant for a cardholder. The payment network is configured to process payment card transactions between the merchant and its acquirer bank, and the cardholder and their issuer bank. Authorization request messages include merchant identifiers and cardholder identifiers.

In the example embodiment, the LP computing device stores in a database a collection of loyalty programs which contain loyalty identifiers for the members of the loyalty programs. When the payment network receives an authorization request for a cardholder transaction from a merchant, the LP computing device determines if the cardholder has a loyalty identifier for the merchant's loyalty program. If the cardholder has an associated loyalty identifier, then the LP computing device transmits the cardholder's loyalty identifier to the payment card processing network, which transmits the cardholder's loyalty identifier to the merchant in the transaction authorization response message along with an authorization code for the transaction.

In the above embodiment, each loyalty program is associated with a merchant, who provides rewards to consumers based on the consumer's purchases from the merchant. Each loyalty program requires consumers to register for the loyalty program and issues a unique loyalty identifier to each registered consumer. The LP computing device associates a payment cardholder with a loyalty program by storing in the database the cardholder's loyalty program identifier and associating the loyalty identifier with the cardholder's payment card account number.

When a payment transaction is processed by the payment network, the LP computing device receives a merchant identifier for the originating merchant and automatically generates a query that queries the database to determine if the originating merchant associated with the payment transaction is associated with one of the stored loyalty programs. If the originating merchant has an associated loyalty program, the LP computing device queries the database to retrieve the loyalty identifier of the cardholder associated with the payment transaction. In some embodiments, the LP computing device transmits the retrieved loyalty identifier to the payment network, which transmits the cardholder's loyalty identifier to the merchant with the transaction authorization response message. In other embodiments, LP computing device stores the loyalty identifiers from the processed payment transactions and periodically transmits the stored loyalty identifiers associated with transactions to the merchant in batches.

The payment network may facilitate a payment cardholder registering the payment cardholder's loyalty identifier for a loyalty program in a loyalty tracking service. In some embodiments, the LP computing device facilitates the cardholder typing his or her loyalty identifier into the database. In other embodiments, the LP computing device may store the cardholder's loyalty identifier by receiving from the cardholder a picture of his or her loyalty program card and determining the loyalty identifier from that picture.

In some further embodiments, the loyalty program may be configured to provide a reward to a registered cardholder based on the number of dollars spent, number of points earned, or number of transactions. In other embodiments, the loyalty program may be configured to provide the cardholder with a discount on products or services purchased. In this particular embodiment, the LP computing device may recalculate the transaction and reinitiate the payment transaction approval process for the new amount.

The methods and systems described herein may be implemented using computer programming or engineering techniques including computer software, firmware, hardware, or any combination or subset wherein a technical effect of the systems and processes described herein is achieved by performing at least one of the following steps: (a) receiving a loyalty identifier for a cardholder by (1) receiving a picture of a merchant-based loyalty program card associated with the cardholder and (2) determining the loyalty identifier associated with the cardholder based on the picture; (b) storing at least one loyalty identifier for a merchant-based loyalty program in association with a cardholder's payment card identifier, wherein the merchant-based loyalty program provides rewards based on at least one of number of points earned, number of dollars spent, and number of transactions completed; (c) receiving a first authorization request message for a payment transaction originating from an originating merchant for a cardholder, the first authorization request message includes a merchant identifier and the cardholder's payment card identifier associated with a payment card, where the payment transaction was initiated by the cardholder using a payment card issued by an issuing bank; (d) determining a merchant-based loyalty program associated with the originating merchant based in part on the merchant identifier; (e) determining the loyalty identifier associated with the cardholder for the merchant-based loyalty program based in part on the cardholder identifier; (f) transmitting the determined loyalty identifier to a payment processing network to be included in a transaction authorization response sent to the merchant.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Washington). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

The term loyalty program, as used herein, may refer to a loyalty program associated with payment cards, hotel stays, airline flights, car rentals, websites visited, gaming, and any other item capable of generating rewards. The examples are not limiting as to the items that a loyalty program may be associated with. A loyalty program may be with particular merchant, a loyalty program may cover a partnership between multiple merchants, or a loyalty programs may cover partnerships between merchants, issuing banks, and/or a payment processing network, or any combination thereof.

FIG. 1 is a schematic diagram illustrating an example multi-party transaction card industry system 120 for enabling ordinary payment-by-card transactions in which merchants 124 and card issuers 130 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, New York).

In a typical transaction card system, a financial institution called the "issuer" issues a transaction card, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with the computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a merchant identifier, a cardholder identifier, and a transaction amount, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
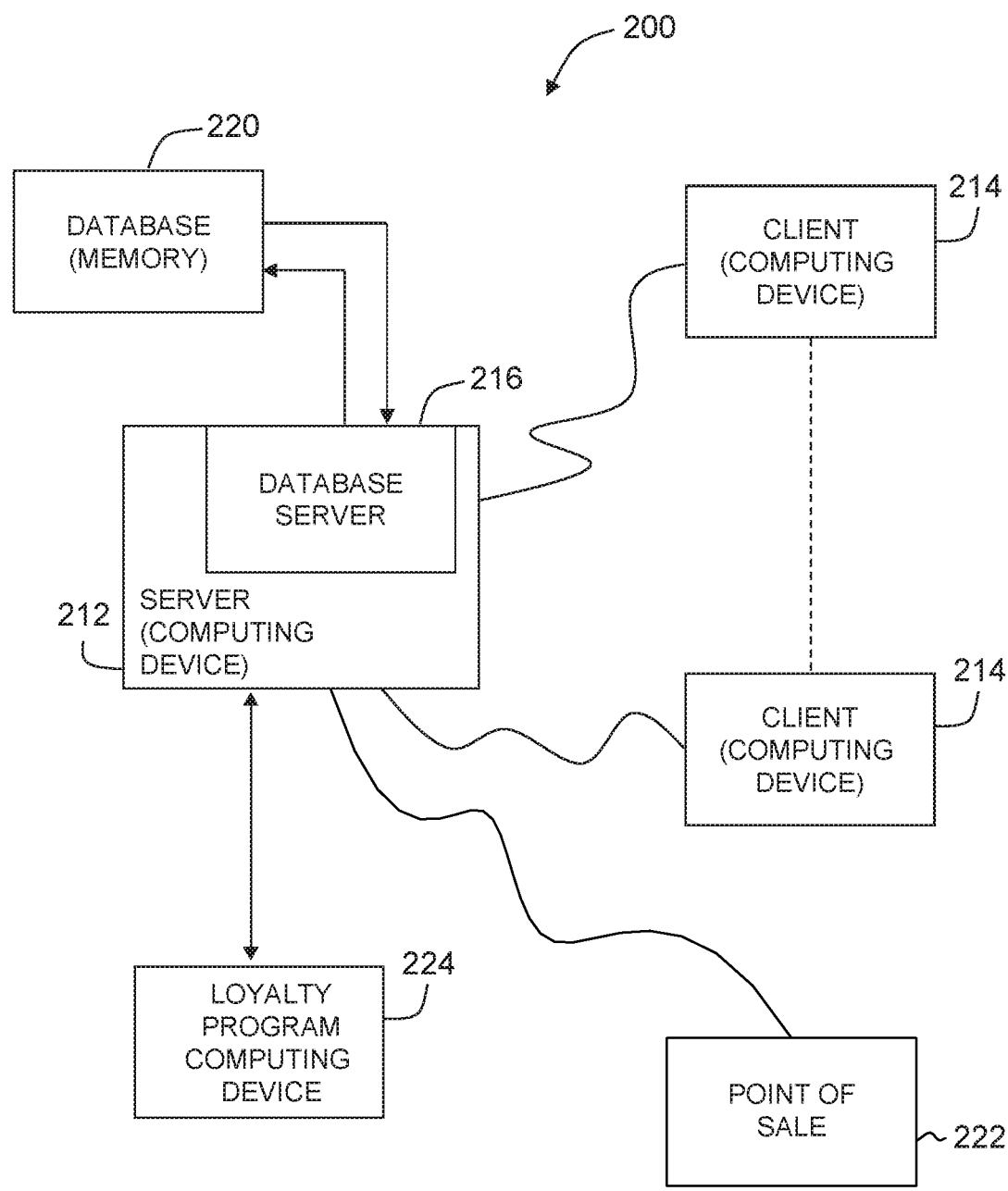

FIG. 2 is a simplified block diagram of an example system 200 including a plurality of computer devices in accordance with one example embodiment of the present invention. In the example embodiment, system 200 may be used for performing payment-by-card transactions received as part of processing cardholder transactions. In addition, system 200 is a payment processing system that includes a loyalty program ("LP") computing device 224 configured to determine a cardholder's loyalty identifier based on an authorization request message. As described below in more detail, LP computing device 224 is configured to receive an authorization request message for a payment transaction originating from a merchant 124 for a cardholder 122 (both shown in FIG. 1), determine the cardholder's loyalty identifier for the merchant's loyalty program, and transmit the determined loyalty identifier.

In the example embodiment, client systems 214 are computers that include a web browser or a software application, which enables client systems 214 to access server system 212 using the Internet. More specifically, client systems 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 214 can be any device capable of accessing the Internet including, but not limited to, a desktop computer, a laptop computer, a personal digital assistant (PDA), a cellular phone, a smartphone, a tablet, a phablet, or other web-based connectable equipment.

A database server 216 is communicatively coupled to a database 220 that stores data. In one embodiment, database 220 includes loyalty program information including at least one merchant identifier and loyalty identifiers. In the example embodiment, database 220 is stored remotely from server system 212. In some embodiments, database 220 is decentralized. In the example embodiment, a person can access database 220 via client systems 214 by logging onto server system 212, as described herein.

The LP computing device 224 is communicatively coupled with the server system 212. The LP computing device 224 can access the server system 212 to store and access data and to communicate with the client systems 214 through the server system 212. In some embodiments, the LP computing device 224 may be associated with, or is part of the payment system, or in communication with the payment card system payment network 120, shown in FIG. 1. In other embodiments, the PG computing device 224 is associated with a third party and is merely in communication with the payment network 120.

One or more point of sale systems 222 are communicatively coupled with the server system 212. The one or more point of sale systems 222 can be merchants 124 shown in FIG. 1, where the point of sale systems 222 are communicatively coupled with the server system through the payment network 120. Point of sale systems 222 may be, but are not limited to, machines that accept card swipes, online payment portals, or stored payment card numbers for recurring transactions.

In some embodiments, server system 212 may be associated with a financial transaction interchange network 128 shown in FIG. 1, and may be referred to as an interchange computer system. Server system 212 may be used for processing transaction data and for registering cardholders and/or merchants into a plurality of programs offered by the interchange network, including, but not limited to, a rewards program. In addition, at least one of client systems 214 may include a computer system associated with an issuer of a transaction card. Accordingly, server system 212 and client systems 214 may be utilized to process transaction data relating to purchases a cardholder 122 makes utilizing a transaction card processed by the interchange network and issued by the associated issuer. At least one client system 214 may be associated with a user or a cardholder 122 seeking to register, access information, or process a transaction with at least one of the interchange network 128, the issuer 130, or the merchant 124. In addition, client systems 214 or point of sales devices 222 may include point-of-sale (POS) devices associated with a merchant 124 and used for processing payment transactions. POS devices 222 may be, but are not limited to, machines that accept card swipes, online payment portals, or stored payment card numbers for recurring transactions.

In some embodiments, instead of reading a magnetic strip on a card, biometric data may be used to verify a cardholder's payment card account information. For example, the POS device 222 may scan the cardholder's fingerprint, handprint, retina, iris, or any other biometric feature used for identifying a person. This scan would then be provided to the payment network. This scan may be provided to the payment network 120 through the authorization request message.

Figure 3:
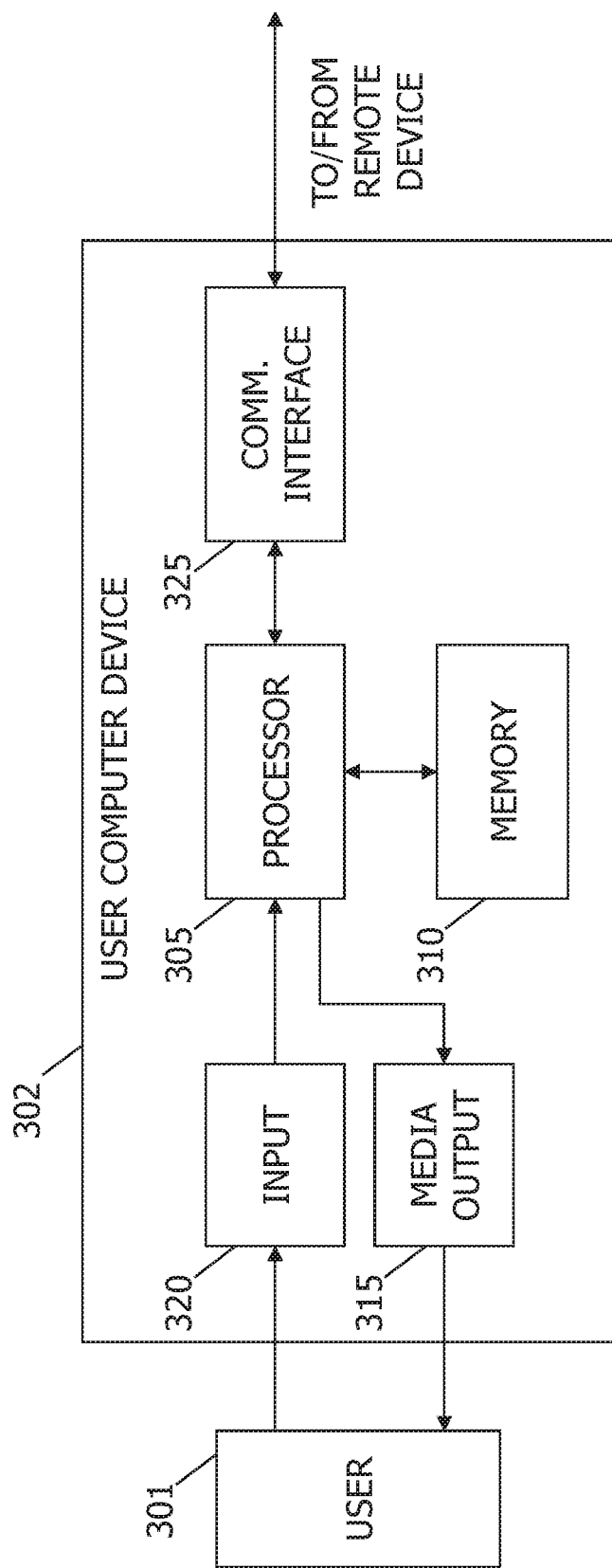

FIG. 3 illustrates an example configuration of a client system 214 shown in FIG. 2, in accordance with one embodiment of the present disclosure. User computer device 302 is operated by a user 301. User computer device 302 may include, but is not limited to, client systems 214 (shown in FIG. 2). User computer device 302 includes one or more processors 305 for executing instructions. In some embodiments, executable instructions are stored in to one or more memory areas 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as server system 212 (shown in FIG. 2). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from server system 212. A client application allows user 301 to interact with, for example, server system 212. For example, instructions may be stored by a cloud service, and the output of the execution of the instructions sent to the media output component 315.

Figure 4:
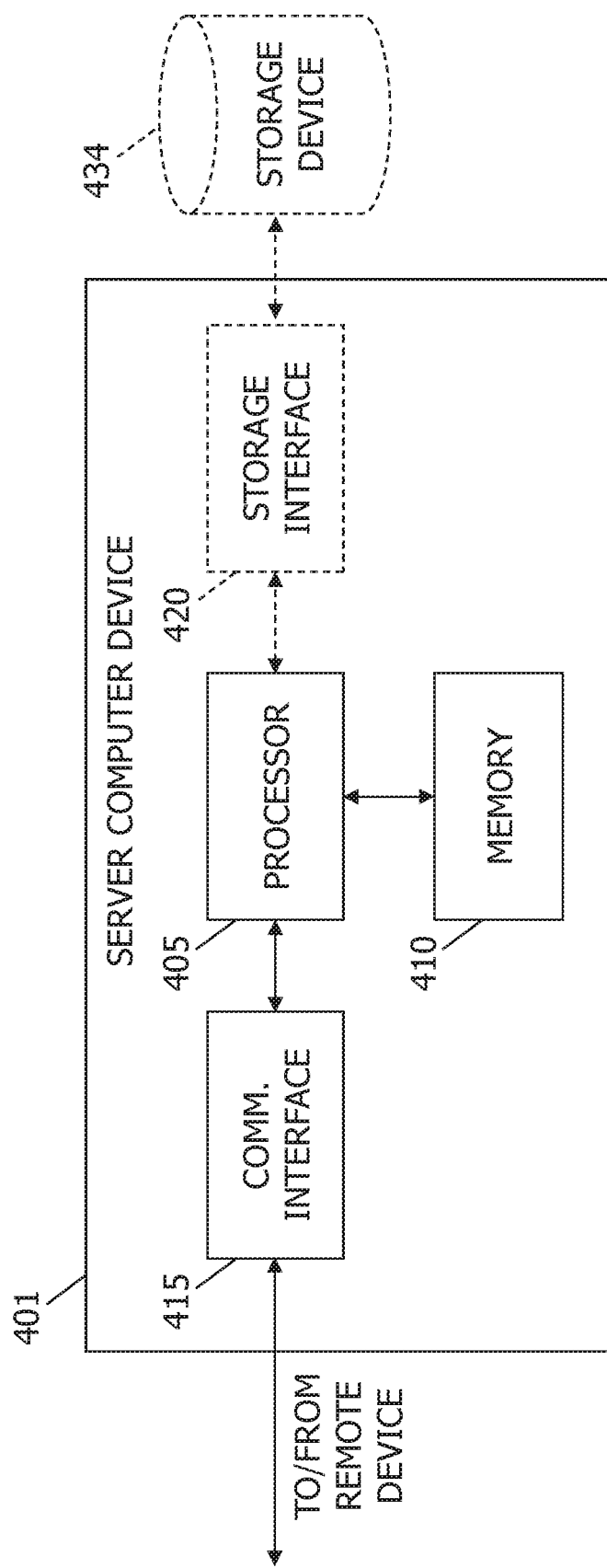

FIG. 4 illustrates an example configuration of the server system 212 shown in FIG. 2, in accordance with one embodiment of the present disclosure. Server computer device 401 may include, but is not limited to, database server 216 (shown in FIG. 2). Server computer device 401 also includes one or more processors 405 for executing instructions. Instructions may be stored in one or more memory areas 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 214, or LP computing device 224 (both shown in FIG. 2). For example, communication interface 415 may receive requests from client systems 214 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 6:
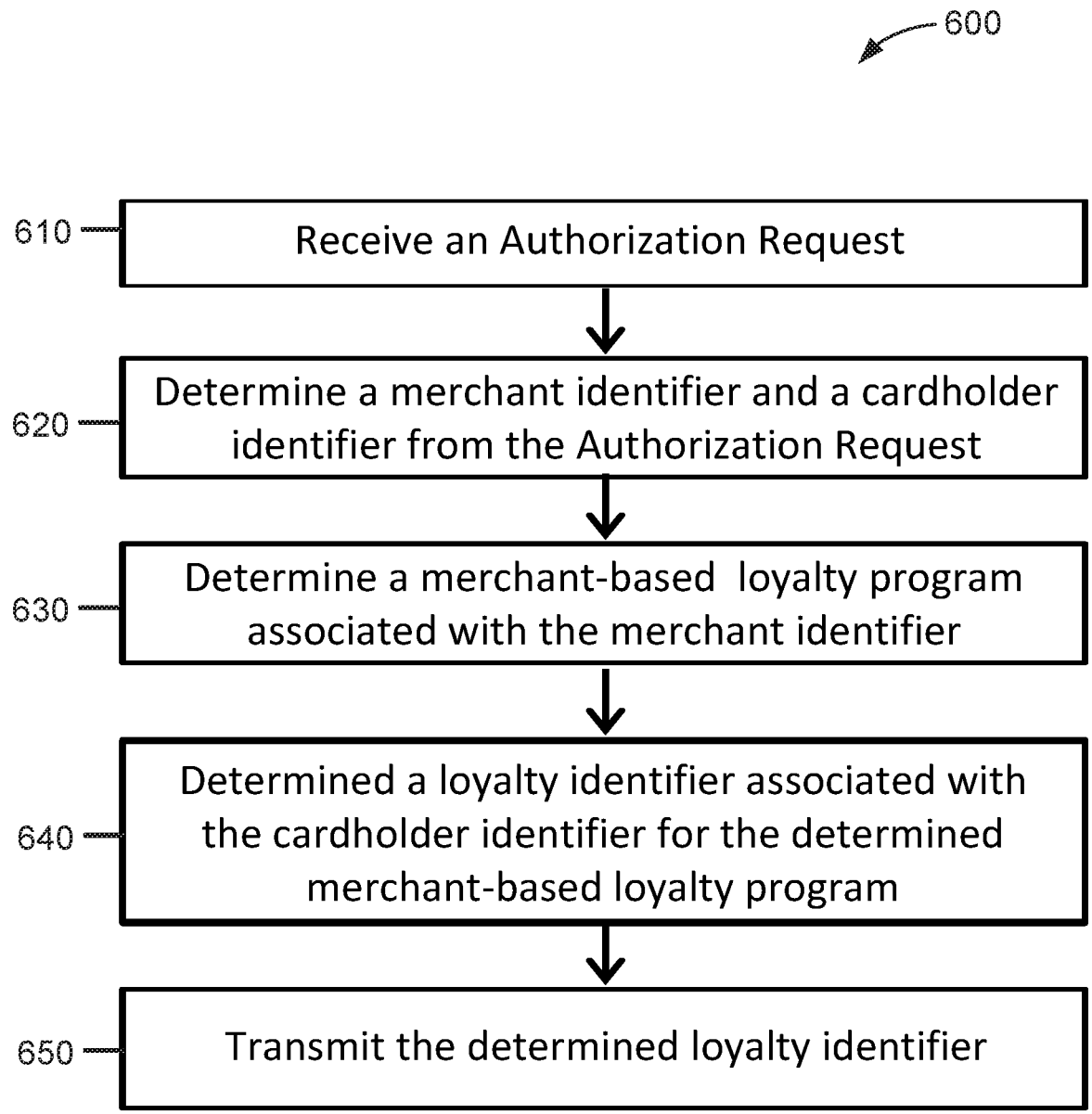
Figure 7:
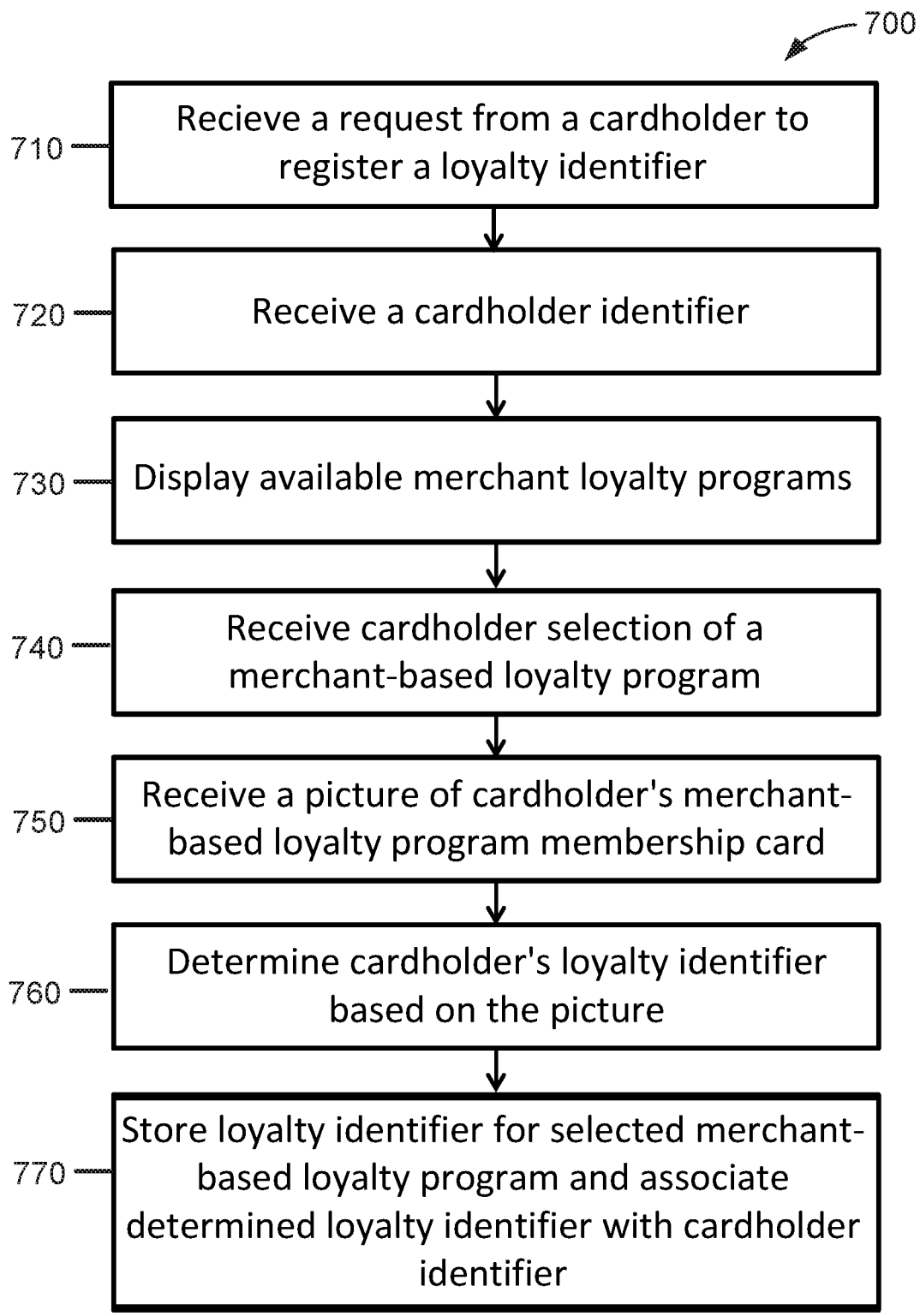

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 is programmed with instructions such as illustrated in FIGS. 6 & 7.

Figure 5:
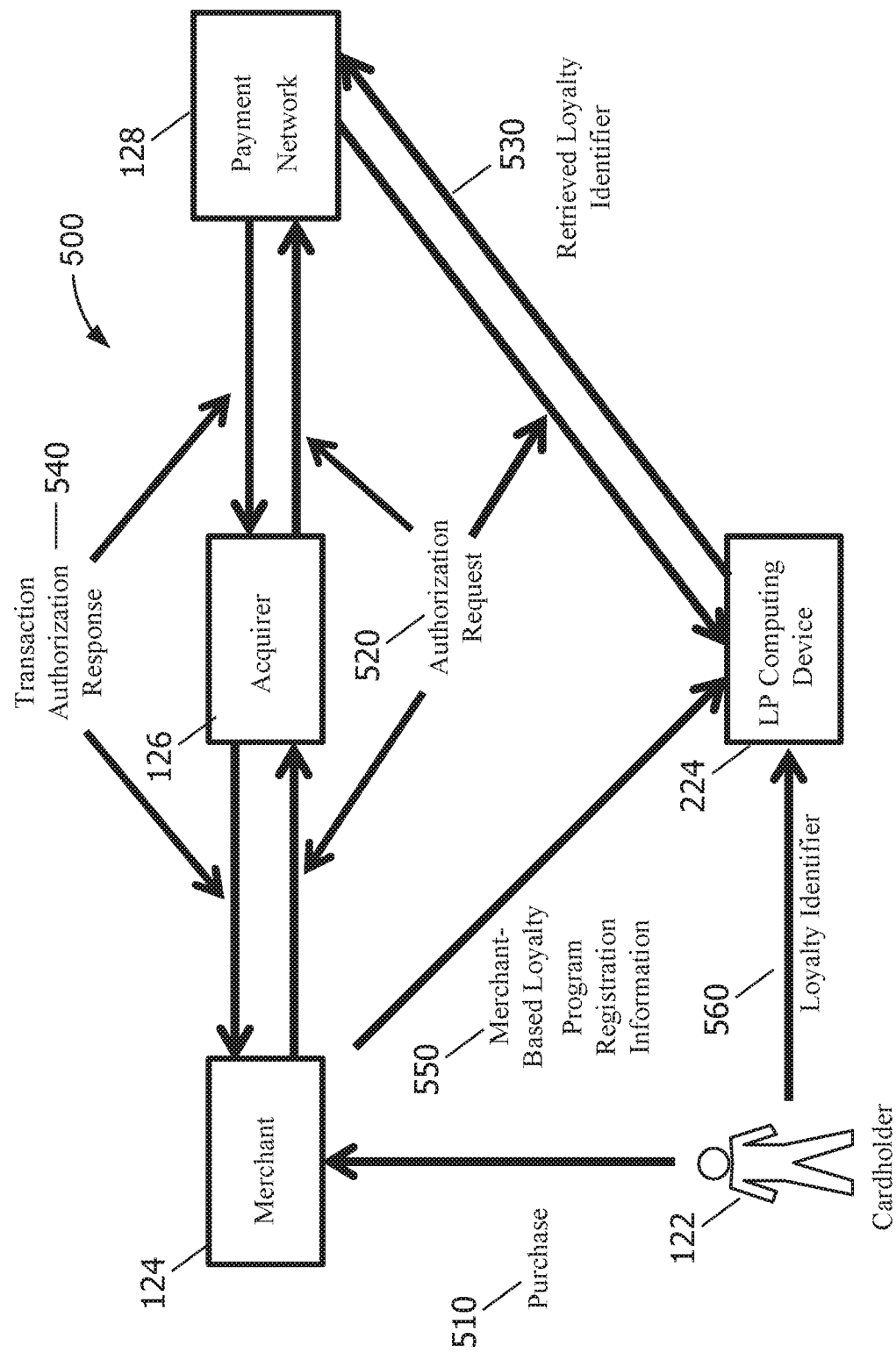

FIG. 5 is a schematic diagram 500 which illustrates an example of integrating a multi-party payment card system 120 (shown in FIG. 1) with determining cardholder loyalty identifiers for loyalty programs. In the example embodiment, when a cardholder 122 initiates a purchase 510 at an originating merchant 124 with a payment card, an authorization request 520 is sent to the acquirer 126, to the payment network 128, and then to the issuer processor 130, as shown in FIG. 1. The cardholder's purchase 510 may be initiated through many methods including, but not limited to, a card swipe, an online purchase, or a recurring charge and may be initiate by one of the point-of-sale devices 222, shown in FIG. 2. The authorization request 520 includes transaction information including a merchant identifier, a cardholder identifier associated with the payment card, and other data. In the example embodiment, the LP computing device 224 is associated with the payment network 128 and thus the database accessed by the LP computing device 224 is a payment processor database. In another embodiment, the LP computing device 224 may be separate from the payment network 128 and thus the database accessed by the LP computing device 224 is an LP database.

The LP computing device 224 stores in the database 220 (show in FIG. 2) a plurality of loyalty programs, where each loyalty program may contain at least one merchant identifier and a plurality of loyalty identifiers, and where each loyalty identifier is associated with a cardholder identifier. In the example embodiment, the cardholder identifier is the cardholder's payment card account number. The LP computing device 224 uses the merchant identifier from the authorization request 520 to query the database 220 to determine which, if any, loyalty program is associated with the originating merchant 124. If an appropriate loyalty program is found, then the LP computing device 224 uses the cardholder identifier to query the database 220 to retrieve the loyalty identifier associated with the cardholder 122. While in this embodiment, the LP computing device 224 queries the database 220 twice, in other embodiments determining the loyalty program and determining the loyalty identifier for the cardholder 122 could be accomplished in one query.

In the example embodiment, the LP computing device 224 transmits the retrieved loyalty identifier 530 to the payment network 128. The payment network formats loyalty identifier 530 so that is can be included within a transaction authorization response 540 and transmits the retrieved loyalty identifier 530 to the merchant 124 with the transaction authorization response 540. In other embodiments, the LP computing device 224 stores the retrieved loyalty identifiers 530 from the processed payment transactions and periodically transmits the stored loyalty identifiers associated with transactions to the merchant 124 in batches.

In the example embodiment, the LP computing device 224 enables a merchant 124 to register a loyalty program. In this embodiment, LP computing device 224 can receive from the merchant 124 loyalty program registration information 550. The loyalty program registration information 550 may include one or more merchant identifiers associated with the loyalty program, one or more formats for loyalty identifiers for that loyalty program, and other information to identify the loyalty program and associated loyalty identifiers.

In the example embodiment, the LP computing device 224 enables cardholders 122 to register with a loyalty program. In this embodiment, the LP computing device 224 receives a cardholder's loyalty identifier 560 and associates the loyalty identifier 560 with the cardholder identifier and the associated loyalty program.

In the example embodiments, the loyalty program may be configured to provide a reward to a registered cardholder 122 based on the number of dollars spent, number of points earned, or number of transactions. In other embodiments, the loyalty program may be configured to provide the cardholder 122 with a discount on products or services purchased. In such embodiments, the authorization request 520 also includes a transaction amount. When the LP computing device 224 determines the loyalty program, the LP computing device 224 also determines a discount for the transaction. The LP computing device 224 recalculates the transaction amount and reinitiates the payment transaction approval process for the discounted amount. In other embodiments, the difference between the original transaction amount and the discounted amount could be provided to the cardholder 122 as a refund or rebate.

FIG. 6 is a flowchart illustrating an example of the process 600 of determining a loyalty identifier for a cardholder 122 (shown in FIG. 1) based on an authorization request 520 (shown in FIG. 5) using the system 200 shown in FIG. 2, in accordance with one embodiment of the disclosure. Process 600 may be implemented by a computing device, for example the LP computing device 224 (shown in FIG. 2). In the example embodiment, the LP computing device 224 receives 610 the authorization request 520. The LP computing device 224 determines 620 a merchant identifier and a cardholder identifier associated with a payment card from the authorization request 520. The LP computing device 224 determines 630 a loyalty program associated with that merchant identifier. The LP computing device 224 uses the merchant identifier from the authorization request 520 to query the database 220 (shown in FIG. 2) to determine which, if any, loyalty program is associated with the originating merchant 124 (shown in FIG. 1). If an appropriate loyalty program is found, then the LP computing device 224 determines 640 a loyalty identifier associated with the cardholder identifier for the determined loyalty program. The LP computing device 224 uses the cardholder identifier to query the database 220 to retrieve the loyalty identifier associated with the cardholder 122. While in this embodiment, the LP computing device 224 queries the database 220 twice, in steps 630 and 640, in other embodiments these steps could be combined into one query. The LP computing device 224 transmits 650 the determined loyalty identifier to the originating merchant 124.

FIG. 7 is a flowchart illustrating an example process 700 of a cardholder 122 (shown in FIG. 1) registering for a loyalty program using the system 200 shown in FIG. 2, in accordance with one embodiment of the present disclosure. Process 700 may be implemented using a computing device, for example the LP computing device 224 (shown in FIG. 2). The payment network 120 (shown in FIG. 1) may facilitate a payment cardholder registering the payment cardholder's loyalty identifier for a loyalty program in a loyalty tracking service. In the example embodiment, the LP computing device 224 receives 710 a request from a cardholder 122 (shown in FIG. 1) to register a loyalty identifier associated with a loyalty program. The LP computing device 224 may receive the request from the cardholder 122 through communication with client system 214 via server system 212 (both shown in FIG. 2). The LP computing device 224 receives 720 a cardholder identifier associated with a payment card issued by an issuing bank 130 (shown in FIG. 1) for the cardholder 122. In some embodiments, the cardholder identifier may the cardholder's payment card account number. The LP computing device 224 instructs client system 214 to display 730 the available loyalty programs, which may be loyalty programs that have provided loyalty program registration information 550 as shown in FIG. 5. The LP computing device 224 instructs the cardholder's client system 214 (shown in FIG. 2) to display to the cardholder 122 the available loyalty programs so that the cardholder 122 may select a loyalty program. Next, the LP computing device 224 receives 740 the cardholder's selection of which loyalty program the cardholder 122 is registering for from the cardholder's client system 214.

In the example embodiment, the LP computing device 224 receives 750 a picture of the cardholder's loyalty program membership card. The LP computing device 224 determines 760 the cardholder's loyalty identifier based on the picture. In some embodiments, this determination may be accomplished by the LP computing device 224 reading the loyalty identifier off of the loyalty program membership card, for example using optical character recognition (OCR) or the like. In other embodiments, this determination may be accomplished by the LP computing device 224 reading a bar code, or similar machine readable code, on the card and determining the loyalty identifier from the bar code. Then the LP computing device 224 stores 770 the determined loyalty identifier for the selected loyalty program and associates the determined loyalty identifier with the cardholder identifier. In the example embodiment, the LP computing device 224 stores the determined loyalty identifier in the database 220 (shown in FIG. 2), where the database 220 contains the selected loyalty program. In other embodiments, instead of receiving a picture of the cardholder's loyalty program membership card, the LP computing device 224 may receive the loyalty identifier directly by the cardholder 122 submitting the loyalty identifier, for example by typing the identifier.

In some embodiments, instead of reading a magnetic strip on a loyalty program membership card or receiving data wirelessly from a fob device, a cardholder's identity may be authenticated by biometric data of the cardholder. In these embodiments, LP computing device 224 may retrieve the cardholder's loyalty identifier from a consumer profile stored in a cloud device (not shown). The cardholder identifier received by the LP computing device 224 may be a biometric identifier of the cardholder 122, such as data from a scan of the cardholder's fingerprint, handprint, retina, iris, or any other biometric feature used for identifying a person. The LP computing device 224 would query the database 220 with the biometric identifier when determining 640 a loyalty identifier associated with the cardholder identifier for the determined loyalty program, as shown in FIG. 6.

Figure 8:
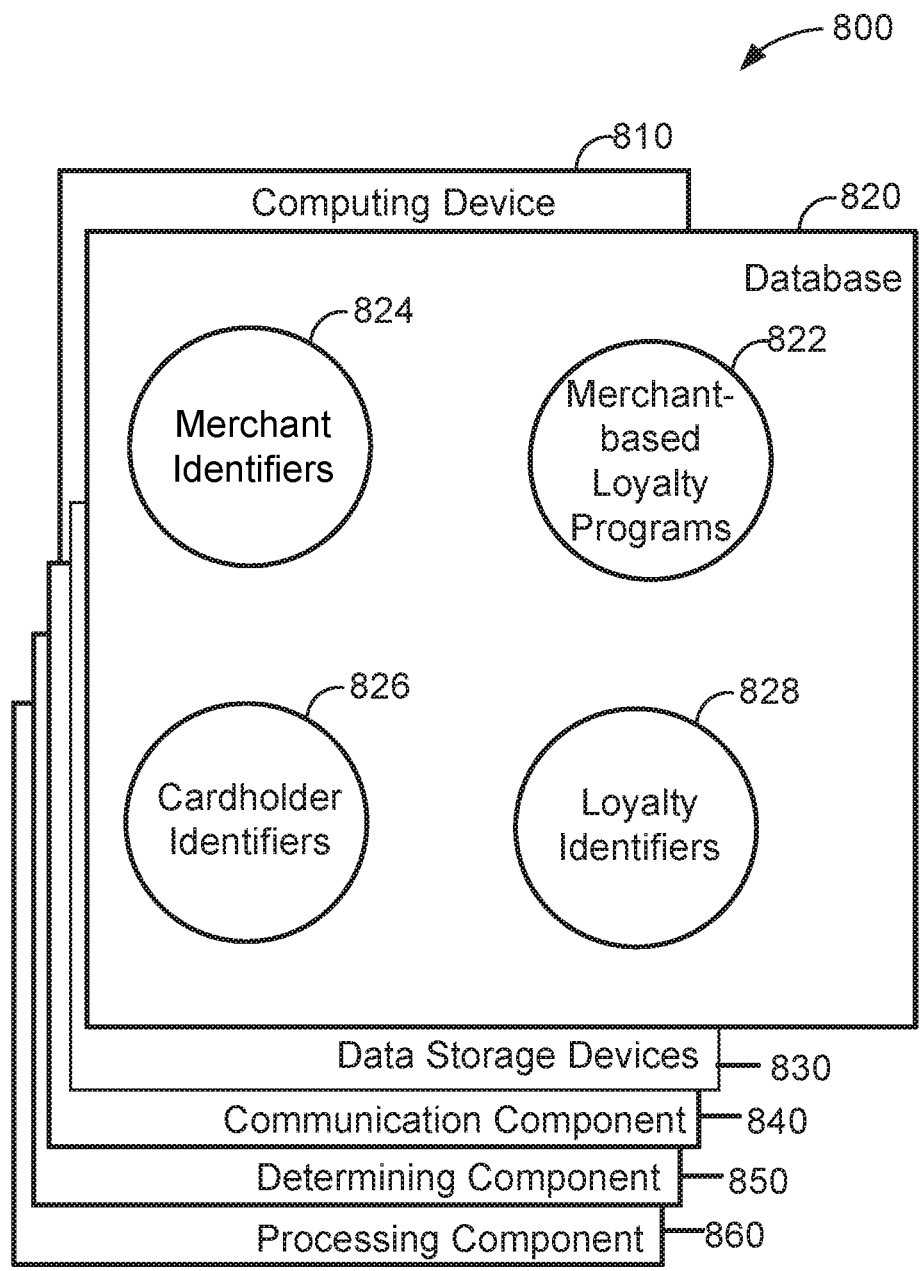

FIG. 8 is a diagram 800 of components of one or more example computing devices that may be used in the system 200 shown in FIG. 2. In some embodiments, computing device 810 is similar to server system 212; it may also be similar to LP computing device 224 (both shown in FIG. 5). Database 820 may be coupled with several separate components within computing device 810, which perform specific tasks. In this embodiment, database 820 stores loyalty programs 822, merchant identifiers 824, cardholder identifiers 826, and loyalty identifiers 828.

Computing device 810 includes the database 820, as well as data storage devices 830. Computing device 810 also includes a communication component 840 for receiving an authorization request 520 (shown in FIG. 5) and transmitting a retrieved loyalty identifier 530 (shown in FIG. 3). Communication component 840 may include, for example, a wired or wireless network adapter and/or a wireless data transceiver for use with a mobile telecommunications network. Computing device 810 also includes a determining component 850 for determining a loyalty program 822 based on a merchant identifier 824 and determining a loyalty identifier 828 based on a cardholder identifier 826. A processing component 860 assists with execution of computer-executable instructions associated with the system.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for providing a loyalty identifier to a merchant using a payment network, said method implemented using a loyalty program (LP) computing device in communication with a memory and a payment network server of the payment network, said method comprising:
   storing, in the memory, a first link to a plurality of consumer profiles, each of the consumer profiles associated with a corresponding cardholder of a plurality of cardholders and including biometric reference data associated with the corresponding cardholder;
   receiving, by the LP computing device from a client device, a registration request for a first cardholder of the plurality of cardholders, the registration request including a selection of a first of a plurality of loyalty programs and a first loyalty identifier associated with the first cardholder and the first loyalty program, each of the plurality of loyalty programs associated with a corresponding merchant identifier of a plurality of merchant identifiers;
   storing, by the LP computing device, a second link between the first loyalty identifier, the first loyalty program, and a corresponding consumer profile associated with the first cardholder within the memory, wherein the first loyalty program includes a discount amount;
   receiving, by the LP computing device from the payment network server, a first authorization request message for a payment transaction initiated by the first cardholder using a payment card at an originating merchant, the first authorization request message including biometric scan data of the first cardholder, a first payment amount, and a first merchant identifier of the plurality of merchant identifiers, the first merchant identifier corresponding to the originating merchant;
   in response to receiving the first authorization request message, querying, by the LP computing device and using the biometric scan data included in the first authorization request message, the memory to identify one of the plurality of consumer profiles having the stored biometric reference data matching the biometric scan data, the identified consumer profile being the corresponding consumer profile which is associated within the memory with the first cardholder and linked to (i) the first loyalty program having the discount amount, and (ii) the first loyalty identifier of the first cardholder;
   determining, by the LP computing device, that the originating merchant is associated with the first loyalty program by querying the memory, by the LP computing device and using the first merchant identifier included in the first authorization request message, to identify a stored merchant identifier associated with the first loyalty program matching to the first merchant identifier;
   calculating, by the LP computing device in real-time, a second payment amount based on the first payment amount and the discount amount included in the first loyalty program as identified by matching the biometric scan data to the stored biometric reference data; and
   transmitting, by the LP computing device, the second payment amount and the first loyalty identifier to the payment network server to complete processing of the first authorization request message.

2. The method of claim 1 further comprising:
   storing, in the memory, the plurality of loyalty programs;
   retrieving, by the LP computing device, the first merchant identifier and the biometric scan data from the first authorization request message; and
   in response to retrieving, automatically querying, by the LP computing device, the memory to identify at least one of the plurality of loyalty programs associated with the first merchant identifier.

3. The method of claim 1 further comprising:
   generating, by the LP computing device, a second authorization request message from the first authorization request message by replacing the first payment amount with the second payment amount; and
   transmitting, by the LP computing device, the second authorization request message to the payment network server.

4. The method of claim 3, wherein the payment network server is configured to:
   transmit the second authorization request message to an issuer processor computer device;
   receive from the issuer processor computer device, in response to the second authorization request message being approved by the issuer processor computer device, an authorization response message;

format the first loyalty identifier to enable inclusion of the first loyalty identifier in the authorization response message; and transmit the authorization response message to the originating merchant including the formatted first loyalty identifier.

5. The method of claim 1 further comprising obtaining the biometric scan data of the first cardholder during the payment transaction.

6. The method of claim 1, wherein receiving the registration request from the first cardholder further comprises receiving, by the LP computing device, a picture of a loyalty program card associated with the first cardholder and determining the first loyalty identifier associated with the first cardholder based on the received picture.

7. The method of claim 1 further comprising:
receiving loyalty program registration information from the originating merchant for the first loyalty program, wherein the loyalty program registration information includes the first merchant identifier; and
storing, in the memory, the loyalty program registration information for the originating merchant including the first merchant identifier.

8. A computing system for providing a loyalty identifier to a merchant using a payment network, said computing system comprising a loyalty program (LP) computing device and a payment network server, the LP computing device comprising one or more processors communicatively coupled to one or more memory devices, said computing system configured to:
store, in the one or more memory devices, a first link to a plurality of consumer profiles, each of the consumer profiles associated with a corresponding cardholder of a plurality of cardholders and including a biometric reference data associated with the corresponding cardholder;
receive, from a client device, a registration request for a first cardholder of the plurality of cardholders, the registration request including a selection of a first of a plurality of loyalty programs and a first loyalty identifier associated with the first cardholder and the selected first loyalty program, each of the plurality of loyalty programs associated with a corresponding merchant identifier of a plurality of merchant identifiers;
store a second link between the first loyalty identifier, the first loyalty program, and a corresponding consumer profile associated with the first cardholder within the one or more memory devices, wherein the first loyalty program includes a discount amount;
receive, from the payment network server, a first authorization request message for a payment transaction initiated by the first cardholder using a payment card at an originating merchant, the first authorization request message including biometric scan data of the first cardholder, a first payment amount, and a first merchant identifier of the plurality of merchant identifiers, the first merchant identifier corresponding to the originating merchant;
in response to receiving the first authorization request message, query using the biometric scan data included in the first authorization request message, the one or more memory devices to identify one of the plurality of consumer profiles having the stored biometric reference data matching the biometric scan data, the identified consumer profile being the corresponding consumer profile which is associated within the one or more memory devices with the first cardholder and linked to (i) the first loyalty program having the discount amount, and (ii) the first loyalty identifier of the first cardholder;
determine that the originating merchant is associated with the first loyalty program by querying the one or more memory devices, by the LP computing device and using the first merchant identifier included in the first authorization request message, to identify a stored merchant identifier associated with the first loyalty program matching to the first merchant identifier;
calculate in real-time a second payment amount based on the first payment amount and the discount amount included in the first loyalty program as identified by matching the biometric scan data to the stored biometric reference data; and
transmit the second payment amount and the first loyalty identifier to the payment network server to complete processing of the first authorization request message.

9. The computing system of claim 8 further configured to:
store, in the one or more memory devices, the plurality of loyalty programs;
retrieve the first merchant identifier and the biometric scan data from the first authorization request message; and
in response to retrieving, automatically query the one or more memory devices to identify at least one of the plurality of loyalty programs associated with the first merchant identifier.

10. The computing system of claim 8 further configured to:
generate a second authorization request message from the first authorization request message by replacing the first payment amount with the second payment amount; and
transmit the second authorization request message to the payment network server.

11. The computing system of claim 10, wherein the payment network server is configured to:
transmit the second authorization request message to an issuer processor computer device;
receive from the issuer processor computer device, in response to the second authorization request message being approved by the issuer processor computer device, an authorization response message;
format the first loyalty identifier to enable inclusion of the first loyalty identifier in the authorization response message; and
transmit the authorization response message to the originating merchant including the formatted first loyalty identifier.

12. The computing system of claim 8 further configured to obtain the biometric scan data of the first cardholder during the payment transaction.

13. The computing system of claim 8, wherein receiving the registration request from the first cardholder further comprises receiving, by the LP computing device, a picture of a loyalty program card associated with the first cardholder and determining the first loyalty identifier associated with the first cardholder based on the received picture.

14. The computing system of claim 8 further configured to:
receive loyalty program registration information from the originating merchant for the first loyalty program, wherein the loyalty program registration information includes the first merchant identifier; and
store, in the one or more memory devices, the loyalty program registration information for the originating merchant including the first merchant identifier.

15. At least one non-transitory computer-readable storage medium having computer-executable instructions embodied thereon, wherein when executed by a loyalty program (LP) computing device, the computer-executable instructions cause the LP computing device to:

store, in one or more memory devices, a first link to a plurality of consumer profiles, each of the consumer profiles associated with a corresponding cardholder of a plurality of cardholders and including a biometric reference data associated with the corresponding cardholder;

receive, from a client device, a registration request for a first cardholder of the plurality of cardholders, the registration request including a selection of a first of a plurality of loyalty programs and a loyalty identifier associated with the first cardholder and the first loyalty program, each of the plurality of loyalty programs associated with a corresponding merchant identifier of a plurality of merchant identifiers;

store a second link between the loyalty identifier, the first loyalty program, and a corresponding consumer profile associated with the first cardholder within the one or more memory devices, wherein the first loyalty program includes a discount amount;

receive, from a payment network server, a first authorization request message for a payment transaction initiated by the first cardholder using a payment card at an originating merchant, the first authorization request message including biometric scan data of the first cardholder, a first payment amount, and a first merchant identifier of the plurality of merchant identifiers, the first merchant identifier corresponding to the originating merchant;

in response to receiving the first authorization request message, using the biometric scan data included in the first authorization request message, the one or more memory devices to identify one of the plurality of consumer profiles having the stored biometric reference data matching the biometric scan data, the identified consumer profile being the corresponding consumer profile which is associated within the one or more memory devices with the first cardholder and linked to (i) the first loyalty program having the discount amount, and (ii) the first loyalty identifier of the first cardholder;

determine that the originating merchant is associated with the first loyalty program by querying the one or more memory devices, by the LP computing device and using the first merchant identifier included in the first authorization request message, to identify a stored merchant identifier associated with the first loyalty program matching to the first merchant identifier;

calculate in real-time a second payment amount based on the first payment amount and the discount amount included in the first loyalty program as identified by matching the biometric scan data to the stored biometric reference data; and transmit the second payment amount and the loyalty identifier to the payment network server to complete processing of the first authorization request message.

16. The at least one non-transitory computer-readable storage medium of claim 15, wherein the computer-executable instructions further cause the LP computing device to:

store, in the one or more memory devices, the plurality of loyalty programs;

retrieve the first merchant identifier and the biometric scan data from the first authorization request message; and in response to retrieving, automatically query the one or more memory devices to identify at least one of the plurality of loyalty programs associated with the first merchant identifier.

17. The at least one non-transitory computer-readable storage medium of claim 15, wherein the computer-executable instructions further cause the LP computing device to:

generate a second authorization request message from the first authorization request message by replacing the first payment amount with the second payment amount; and transmit the second authorization request message.

18. The at least one non-transitory computer-readable storage medium of claim 15, wherein the computer-executable instructions further cause the LP computing device to obtain the biometric scan data of the first cardholder during the payment transaction.

19. The at least one non-transitory computer-readable storage medium of claim 15, wherein receiving the registration request from the first cardholder further comprises receiving, by the LP computing device, a picture of a loyalty program card associated with the first cardholder and determining the loyalty identifier associated with the first cardholder based on the received picture.

20. The at least one non-transitory computer-readable storage medium of claim 15, wherein the computer-executable instructions further cause the LP computing device to:

receive loyalty program registration information from the originating merchant for the first loyalty program, wherein the loyalty program registration information includes the first merchant identifier; and store, in the one or more memory devices, the loyalty program registration information for the originating merchant including the first merchant identifier.

* * * * *